US012493546B2

(12) United States Patent
Sagar et al.

(10) Patent No.: US 12,493,546 B2
(45) Date of Patent: Dec. 9, 2025

(54) PORTABLE BINARY FILES FOR CLIENT SIDE EXECUTION OF FEDERATED APPLICATION PROGRAMMING INTERFACES

(71) Applicant: Salesforce, Inc., San Francisco, CA (US)

(72) Inventors: Gaurav Sagar, Bellevue, WA (US); Antonio Garrote, San Francisco, CA (US); Patricio Barletta, Brentwood, CA (US); Javier Isoldi, Buenos Aires (AR); Alejandro Assi, Buenos Aires (AR); Luis Contreras, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 558 days.

(21) Appl. No.: 17/885,185

(22) Filed: Aug. 10, 2022

(65) Prior Publication Data

US 2024/0054066 A1    Feb. 15, 2024

(51) Int. Cl.
*G06F 11/36* (2025.01)
*G06F 9/54* (2006.01)
*G06F 11/3698* (2025.01)
*G06F 16/953* (2019.01)

(52) U.S. Cl.
CPC .......... *G06F 11/3698* (2025.01); *G06F 9/541* (2013.01); *G06F 9/547* (2013.01); *G06F 16/953* (2019.01)

(58) Field of Classification Search
CPC .... G06F 9/541; G06F 16/953; G06F 11/3664; G06F 9/547
See application file for complete search history.

(56) References Cited

U.S. PATENT DOCUMENTS

| | | | |
|---|---|---|---|
| 11,467,887 B1 * | 10/2022 | Caudill | G06F 9/541 |
| 2016/0092344 A1 * | 3/2016 | Bally | G06F 11/3664 |
| | | | 717/124 |

* cited by examiner

*Primary Examiner* — S. Sough
*Assistant Examiner* — Cheneca Smith
(74) *Attorney, Agent, or Firm* — Holland & Hart LLP

(57) ABSTRACT

A federation management service may receive, via a user interface of the federation management service, a first user input indicating a selection of a testing environment for testing a federated application programming interface (API). The federation management service may receive, in response to the first user input, a portable binary file for deployment in a web browser of a client host. In some examples, the portable binary file may include a first set of scripts for orchestrating query requests for the federated API and a second set of scripts for orchestrating communications between the web browser of the client host and the first set of scripts. The federation management service may then execute, within the web browser of the client host, a query of the federated API using the first set of scripts and the second set of scripts.

20 Claims, 11 Drawing Sheets

PORTABLE BINARY FILES FOR CLIENT SIDE EXECUTION OF FEDERATED APPLICATION PROGRAMMING INTERFACES

FIELD OF TECHNOLOGY

The present disclosure relates generally to data processing, and more specifically to portable binary files for client side execution of federated application programming interfaces.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant data processing system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may interface with one or more databases, application programming interfaces (APIs), or web services. A federated API may aggregate one or more data sources and may federate fields as they exist in the data sources.

DETAILED DESCRIPTION

Figure 1:
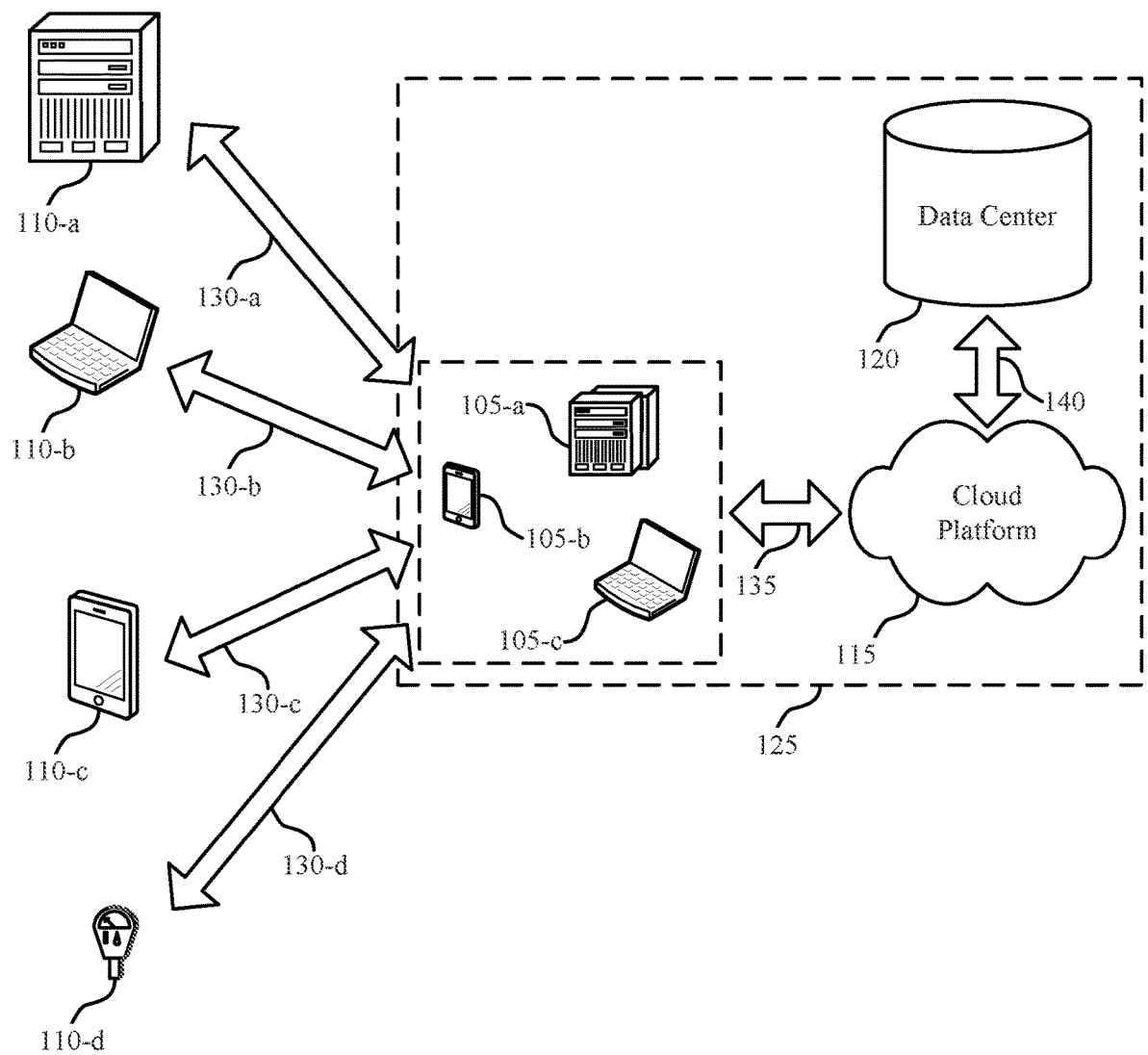
FIG. 1 illustrates an example of a data processing system that supports portable binary files for client side execution of federated application programming interfaces in accordance with aspects of the present disclosure.

Some software applications may retrieve data from multiple data sources. For example, an application that provides the status of an online purchase may retrieve data from a first data source that includes shipping information related to the online purchase, a second data source that includes order status information related to the online purchase, and a third data source that includes details related to the item being purchased. The application may interface with these data sources via one or more application programming interfaces (APIs). In some examples, one or more of the data sources may be examples of source APIs, databases, or other types of data sources. Conventional techniques for retrieving data from source APIs (or other data sources) involve querying individual sources and merging or linking fields via hard-coded relationships.

A federation management service may support a federated (aggregated, unified) API that can provide access to multiple constituent data sources. For example, a user (e.g., an API architect or developer) of the federation management service may declaratively link objects or fields from different data sources via a user interface. The federation management service may generate the federated API with a data schema that is compatible with the underlying data sources. As described herein, a federated API may also be referred to as a DataGraph. In some cases, the federated API may not support data sources with different formats or functionalities. In some examples, a federation management service may generate a federated API that aggregates multiple data sources (e.g., APIs, databases, etc.), such that downstream consumers of the federated API can make a single query or API call to retrieve data from the multiple data sources. However, federation services typically involve deploying a runtime service (e.g., a gateway service) on compute resources (e.g., on cloud-based resources) that are allocated and paid for by the customer of the federation service. These compute resources may be costly to initialize and to maintain, but are typically used for running federated APIs at scale in a production environment. However, some scenarios, such as development and testing environments, may not use large or scalable compute resources to execute the federated API.

One or more aspects of the present disclosure provide for techniques for compiling an engine logic of the federation gateway service into a portable binary format (e.g., web assembly format) that can be executed on a client host (e.g., a web browser or some other local compute environment) instead of executing on allocated compute resources. The compiled engine logic may represent the same source code and may have the same functionality as the runtime service as if it were running on allocated cloud resources. Additionally, the present techniques provide for switching between testing environment and development environment such that a developer may be able to test the federated API using the portable binary format. This solution not only saves costs by avoiding the allocation of cloud resources, but is also easier on the customer, because they no longer have to go through the technical process of provisioning the resources.

Aspects of the disclosure are initially described in the context of an environment supporting an on-demand database service. Aspects of the disclosure are further illustrated by and described with reference to system. Aspects of the disclosure are further illustrated by and described with reference to apparatus diagrams, system diagrams, and flowcharts that relate to portable binary files for client side execution of federated application programming interfaces.

FIG. 1 illustrates an example of a system 100 for cloud computing that supports portable binary files for client side execution of federated application programming interfaces in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In accordance with aspects of the present disclosure, a federation management service supported by the cloud platform 115 may receive, via a user interface of the federation management service, a first user input indicating a selection of a testing environment for testing a federated API. The federation management service may receive, in response to the first user input, a portable binary file for deployment in a web browser of a client host. In some examples, the portable binary file may include a first set of scripts for orchestrating query requests for the federated API and a second set of scripts for orchestrating communications between the web browser of the client host and the first set of scripts. The federation management service may then execute, within the web browser of the client host, a query of the federated API using the first set of scripts and the second set of scripts.

Aspects of the data processing system 100 may be implemented to realize one or more of the following advantages. The described techniques may result in higher user satisfaction, reduced manual interaction, and greater processing efficiency, among other examples. More specifically, the techniques described herein may enable users of a federation management service to build and test a federation API without having to provision computing resources. Using portable binary formats for testing a federated API may result in fewer errors and less resource usage (in comparison to conventional solutions that utilize dedicated cloud resources for developing and testing a federated API).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
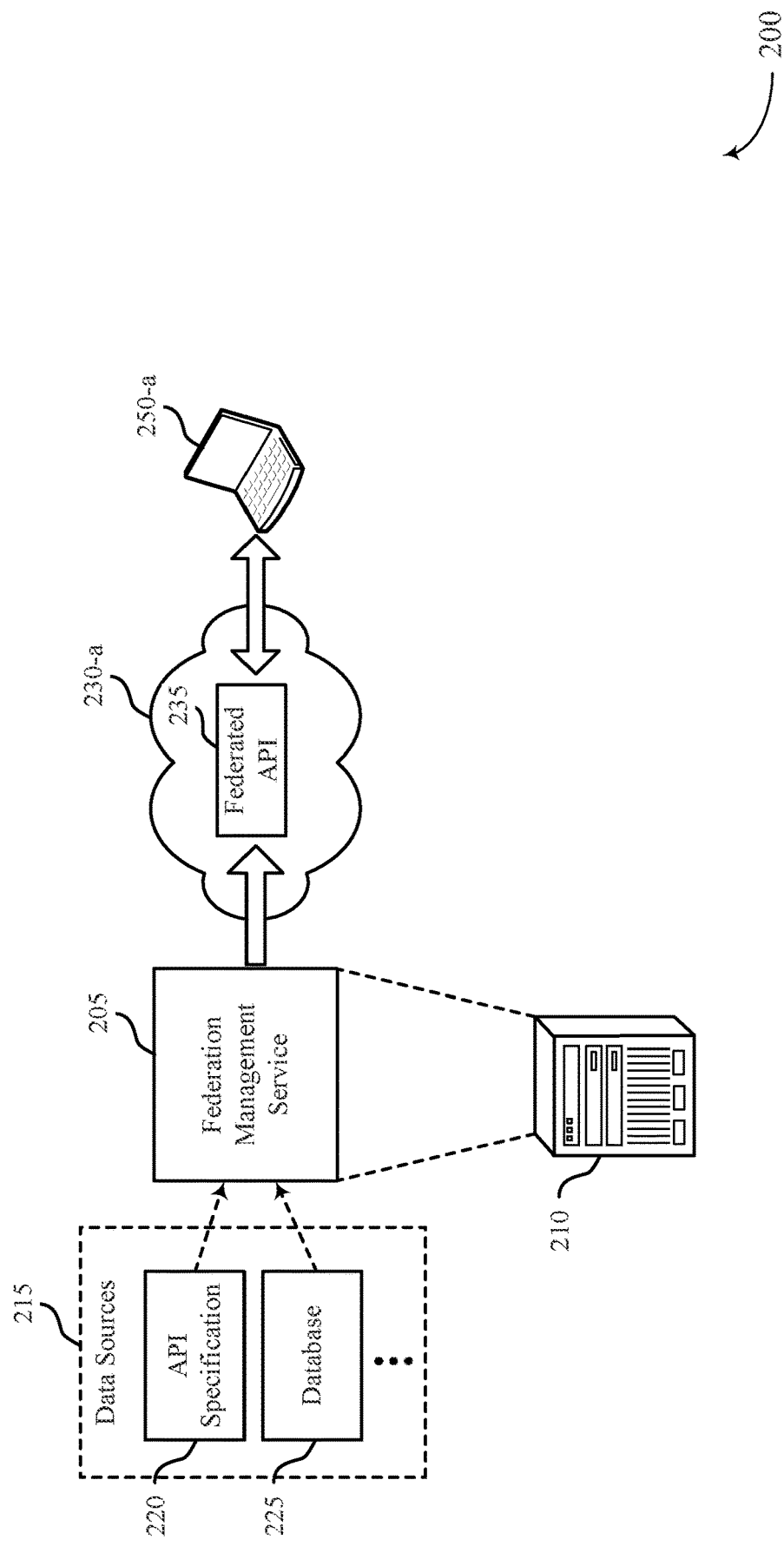
FIG. 2 illustrates an example of a computing environment that supports portable binary files for client side execution of federated application programming interfaces in accordance with aspects of the present disclosure.

FIG. 2 illustrates an example of a computing environment 200 that supports portable binary files for client side execution of federated application programming interfaces in accordance with aspects of the present disclosure. The computing environment 200 may implement or be implemented by aspects of the data processing system 100. For example, the computing environment 200 may include a server 210, hosts 230, and client devices 250. The server 210 may be an example of aspects of the cloud platform 115 or the sub-system 125, as described with reference to FIG. 1. The server 210 may represent various physical or logical computing systems that support a federation management service 205 that can be used by clients or tenants (e.g., a cloud client 105 described with reference to FIG. 1) to access applications via client devices 250.

Some applications (e.g., client applications executing on client devices 250, web services, or cloud servers) may retrieve data from multiple data sources, such as data sources 215. For example, an application (or a service supported by an application) may provide a status of an online purchase order, and the application may retrieve data related to shipping information from a first data source, data related to order status information from a second data source, and data related to the item being purchased from a third data source. The application may interface with these data sources using respective APIs. The data sources may include RESTful APIs, Async APIs, gRPC APIs, databases, or the like. Conventional techniques for retrieving data or accessing services may require configuring multiple APIs at an application and configuring the application to process data received from the multiple APIs (e.g., by merging or linking fields via hard-coded relationships).

The federation management service 205 described herein may support the creation of a federated API 235 that provides access to multiple data sources 215. In such examples, a user (e.g., an API architect or administrator) may declaratively link elements from multiple APIs using a user interface. The federation management service 205 may generate a new API having a unified schema that incorporates the linked elements across the multiple data sources 215. In some examples, the federated API may be referred to as a DataGraph. The federation management service 205 may support a user interface that allows a user to select multiple data sources 215 that are to be included in the federated API 235.

The user may also select various deployment configurations, such as a host environment (e.g., a host 230-a, which may be an example of cloud environment), endpoint details, authentication details, and the like. After selecting configuration parameters, the federation management service 205 may ingest or process the data sources 215 (such as an API 220 or a database 225) to generate the federated API 235. The federated API 235 may be deployed at the host environment (e.g., the host 230-a) based on the user-selected parameters. In some examples, the federated API 235 may be deployed in a cloud environment (e.g., the host 230-a). Additionally, or alternatively, the federated API 235 may be deployed at a local host (e.g., a host associated with or supported by the server 210) or a host associated with a tenant or cloud client.

An application or client (e.g., an application or client executing on a client device 250-b) may be configured to access data and services supported by the underlying data sources 215 via an endpoint of the federated API 235. As such, rather than accessing the data from multiple data source endpoints (for each for the data sources 215), the application may be configured to access the data using one or more endpoints of the federated API 235, which may support improved computing efficiency (at the application and the hosts 230) and reduced complexity. However, in some examples, a federated API may expose the some or all of the data from the underlying data sources 215. This exposure may cause some features of the data sources 215 (such as confidential information or experimental elements) to be exposed to end users (e.g., the client device 250-a).

In accordance with aspects of the present disclosure, a federation management service 205 may receive an input from a client device 250 via a user interface. The federation management service 205 may receive, via a user interface of the federation management service 205, a first user input indicating a selection of a testing environment for testing a federated API (e.g., federated API 235). The federation management service 205 may also receive, in response to the first user input, a portable binary file for deployment in a web browser of a client host. In some examples, the portable binary file may include a first set of scripts for orchestrating query requests for the federated API 235 and a second set of scripts for orchestrating communications between the web browser of the client host and the first set of scripts. The federation management service 205 may then execute, within the web browser of the client host, a query of the federated API 235 using the first set of scripts and the second set of scripts.

Aspects of the computing environment 200 may be implemented to realize one or more of the following advantages. The described techniques may result in higher user satisfaction, reduced resource usage, reduced manual interaction, and greater processing efficiency, among other examples. More specifically, the techniques described herein may enable users of a federation management service 205 to build and test a new federation API without having to modify or provision allocated resources. Using portable binary formats for testing a federation API may result in fewer errors and less resource usage (in comparison to conventional solutions that utilize dedicated cloud resources for developing and testing a federation API).

Figure 3:
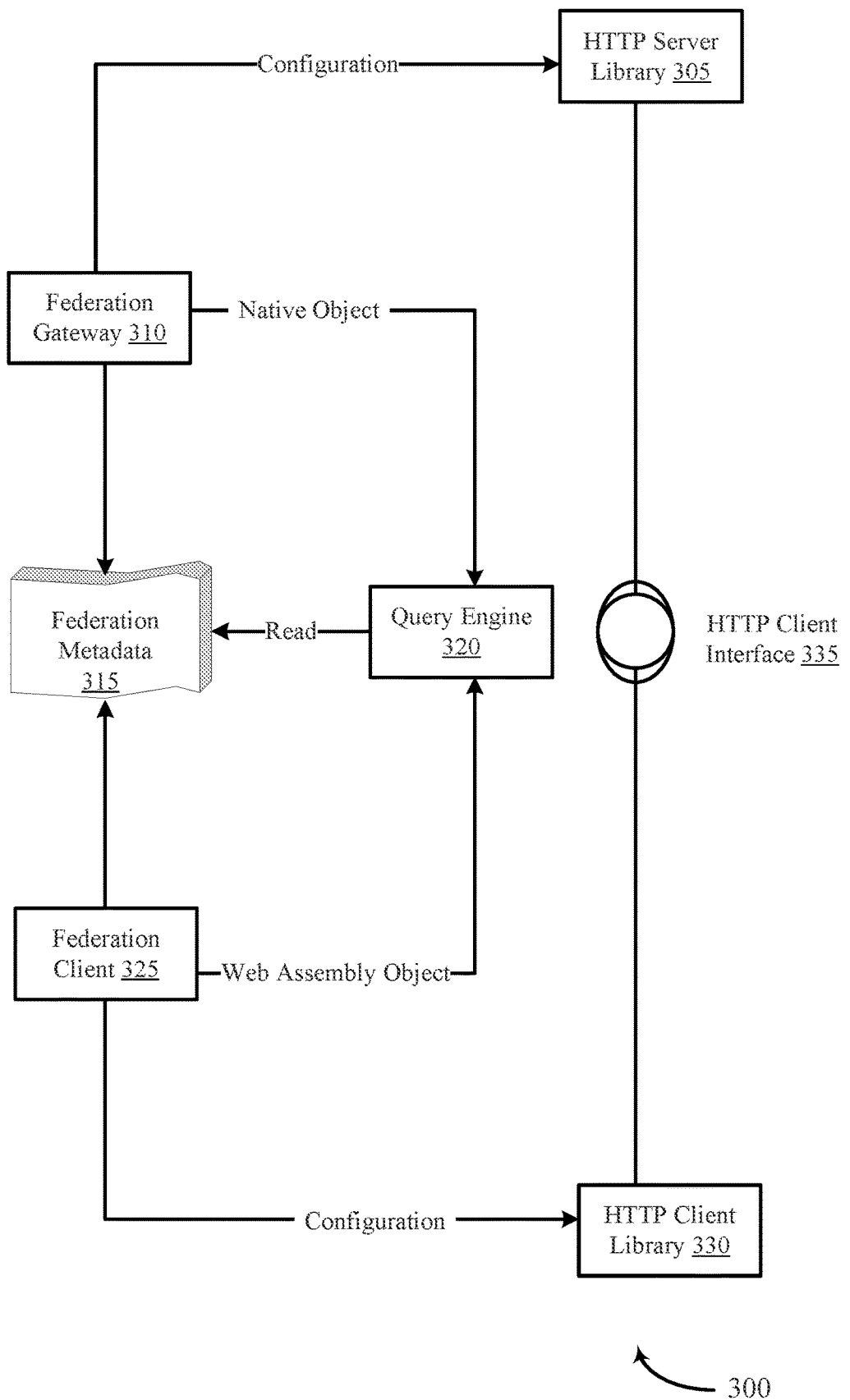
FIG. 3 illustrates an example of a system diagram that supports portable binary files for client side execution of federated application programming interfaces in accordance with aspects of the present disclosure.

FIG. 3 illustrates an example of a system diagram 300 that supports portable binary files for client side execution of federated application programming interfaces in accordance with aspects of the present disclosure. The system diagram 300 may implement or be implemented by aspects of the data processing system 100 or the computing environment 200. For example, the system diagram 300 may include a federation gateway 310 and a federation client 325, which may be included in a federation management service 205, described with reference to FIG. 2. As such, the system diagram 300 illustrates a system for gateway less federation.

As described with reference to FIGS. 1 and 2, a federation management service (e.g., the federation management service 205 described with reference to FIG. 2) may receive a user selection of one or more data sources, via a user interface of the federation management service. In some examples, one or more of the data sources may be associated with different source types. For example, the data sources may be associated with a source type (e.g., GraphQL, representational state transfer (REST), asynchronous (Async), or the like). Each of the data sources may be configured with a set of source extensions. The federation management service may use the data sources to generate a federated API.

In some examples, a customer of the federation management service may input one or more configurations for generating a federated API. For instance, the customer may specify the data sources and the source extensions to use for generating a federated API. The system in system diagram 300 may store such metadata in the federation metadata 315. When using a federation management service, the customers may deploy a runtime code on their computer (using computing resources). Federation management service may rely on the generation of a new federated API that orchestrates the execution of complex queries over a number of federated upstream services. Running the federation management service may often involve allocation of compute resources. Using techniques depicted herein, a customer may run the federated API using a gateway less federation scheme. For instance, the customer of the federation management service may be able to generate the federated API within the client device (e.g., a limited environment such as a web browser on a local machine), without the need for allocation of compute resources (e.g., server clusters or cloud resources). This way, the federation management service may be run on a customer device (e.g., at a web browser) without the customer having to provision and allocate resources. One or more techniques depicted herein provide for simulating the federated API directly on the clients without any use for an additional intermediate service that materializes the federated API as a new network endpoint.

According to aspects depicted herein, the system diagram 300 may be used in multiple contexts where such intermediate "gateway" service cannot be deployed. For example, the system diagram 300 may be used in a development context, where the goal is to immediately test the federated API that is going to be generated and the deployment of a new gateway is not viable in terms of time until the endpoint is available or cost of resources used for a transient deployment that is going to be used to execute a small number of queries. The system diagram 300 may support techniques to implement the engine logic that can be compiled to a portable binary format (e.g., a web assembly format). This binary object can be executed in multiple client hosts, including restrictive environments, like a web browser.

As depicted in the example of FIG. 3, the API federation capability can be delivered through the federation gateway 310 and the federation client 325. The federation gateway 310 may run as a service deployed at runtime and may expose the federated GraphQL schema through a network endpoint. The federation client 325 may run on a client side application without running a new GraphQL service for the federated schema that is only held in-memory on the client-side application. The system diagram 300 may implement the techniques depicted herein to execute a set of GraphQL queries, fetching the data from the upstream federated APIs.

In some examples, a federation management service may receive a first user input indicating a selection of a testing environment for testing a federated API. For instance, the user may use the HTTP client interface 335 to input the selection of a testing environment. This gateway less federation may be run when the user selects the testing environment to test one or more federated APIs. The federation management service also receives, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. For instance, upon selecting a testing environment, the user may input a selection to generate a federated API. Upon receiving the input, the federation gateway 310 may send the native object to the query engine 320. In some examples, the query engine 320 may generate the federated API. To generate the federated API, the query engine 320 may read the federation metadata 315 (provided by the user). The query engine 320 may execute, within the web browser of the client host, a query of the federated API using the first set of scripts and the second set of scripts. As depicted in the example of FIG. 3, the federation client 325 may provide a web assembly object (e.g., portable binary file) to the query engine 320. In some examples, a federation engine can be cross-compiled to an efficient client-side cross-platform object format, like web assembly object. This makes possible to reuse the logic to execute the queries in the client-side and server-side federation solution.

In some examples, the query engine 320 may initialize the client host based on receiving a set of federation metadata when executing the query of the federated API using the first set of scripts and the second set of scripts. The federation client 325 may send the configuration to the HTTP client library 330. In some examples, the HTTP client library 330 may run the federated query via the HTTP client interface 335 in conjunction with the HTTP server library 305. In some examples, the federation gateway 310 and the federation client 325 may rely on a common component.

The system diagram 300 may support switching between different deployment modes. For instance, the federation management service may receive a user input indicating a selection of a standalone development environment for developing one or more APIs. Then, the system diagram 300 may support switching to the standalone development environment from the testing environment based on receiving the user input. The federation client 325, when generating the portable binary format for executing a query, may only include the federation logic and may rely on the host platform for providing the required network connectivity (client-side HTTP library 330 or browser XML HTTPRequest standard DOM object). These capabilities may be injected through configuration of the federation engine library when is packaged for both deployment modes (e.g., standalone and testing).

In some examples, the system diagram 300 may receive authentication information in an ad-hoc way for each implementation. The authentication may be received from configuration in the case of the stand-alone gateway or from the local configuration in the client in the case of the compact engine. In some setups, the compact engine can be connected to the same source of authentication configuration data as the stand-alone version for a more streamlined experience. The query engine 320 and the federation gateway 310 may retrieve, from the client host, a configuration for network connectivity capabilities. The query engine 320 may generate the set of scripts for orchestrating communications between the web browser of the client host and the first set of scripts is based on the configuration. Thus, the techniques depicted herein provide for transparently switching between a stand-alone gateway experience ready for development to a gateway-less local experience to test and experiment ensuring the same runtime behavior and consuming the same metadata configuration. The system supporting the present disclosure can be deployed on multiple type of client hosts and platforms, including web browsers. Additionally or alternatively, the system may be capable of injecting authentication information or connect to a well-defined authentication configuration server.

Figure 4:
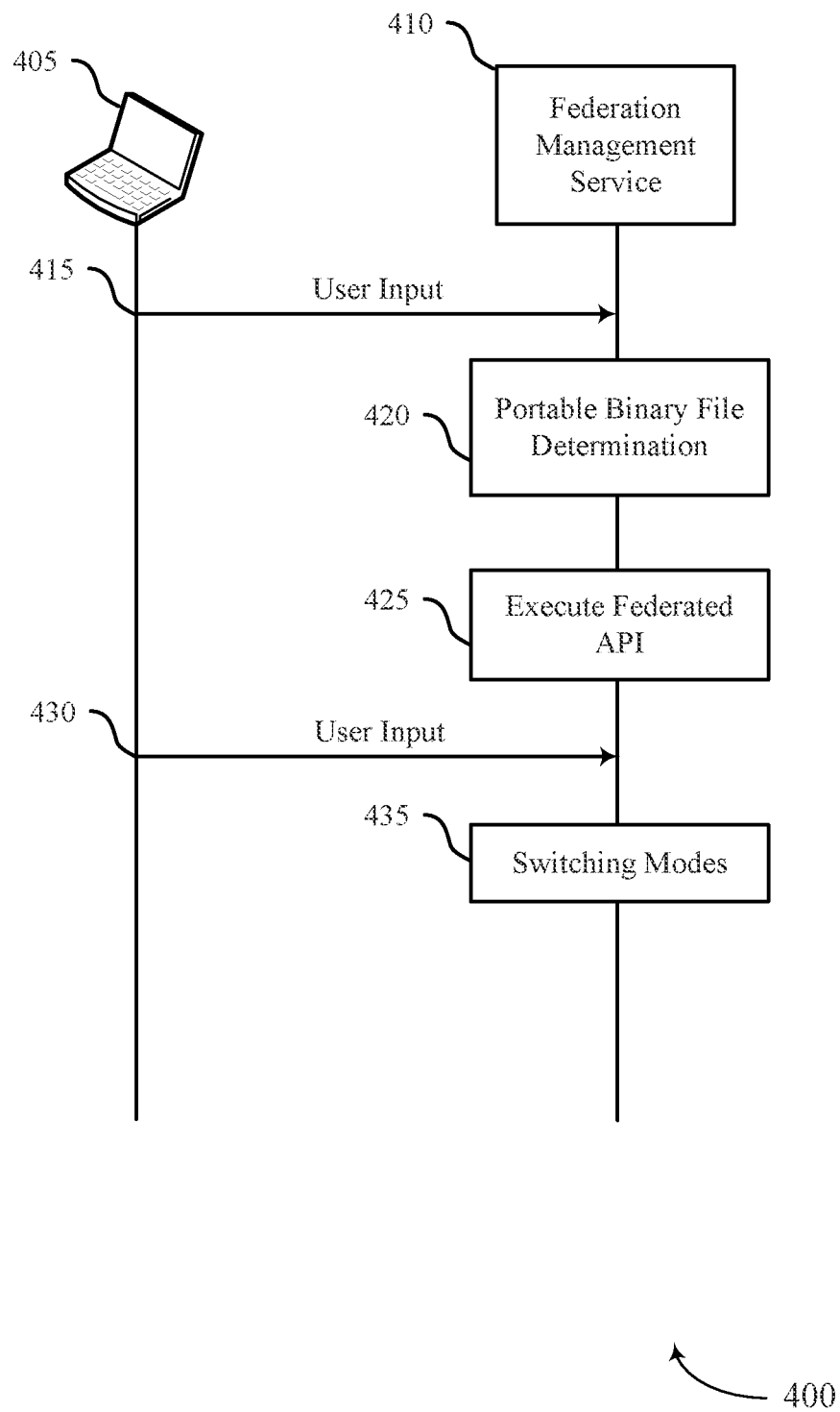
FIG. 4 illustrates an example of a process flow that supports portable binary files for client side execution of federated application programming interfaces in accordance with aspects of the present disclosure.

FIG. 4 illustrates an example of a process flow 400 that supports portable binary files for client side execution of federated application programming interfaces in accordance with aspects of the present disclosure. The process flow 400 may be implemented by aspects of the data processing system 100, the computing environment 200, and the system diagram 300.

The process flow 400 may include a client device 405 and a federation management service 410, which may be examples of the corresponding devices or systems as described with respect to FIGS. 1 through 3. The federation management service 410 may be implemented by one or more servers, as described with respect to FIG. 2. In some examples, some signaling or procedure of the process flow 400 may occur in different orders than shown. Additionally, or alternatively, some additional procedures of signaling may occur, or some signaling or procedures may not occur.

At 415, the federation management service 410, may receive, via a user interface of the federation management service 410, a first user input indicating a selection of a testing environment for testing a federated. In some examples, testing the federated API includes executing the query of the federated API at a set of data sources.

Then, at 420, the federation management service 410 may determine a portable binary file. In some examples, the federation management service 410 may receive, in response to the first user input, a portable binary file for deployment in a web browser of a client host. In some cases, the portable binary file may include a first set of scripts for orchestrating query requests for the federated API and a second set of scripts for orchestrating communications between the web browser of the client host and the first set of scripts. The first set of scripts for orchestrating query requests for the federated API may include a service deployed at runtime. In some examples, the portable binary format may include a web assembly format.

At 425, the federation management service 410 may execute, within the web browser of the client host, a query of the federated API using the first set of scripts and the second set of scripts. Additionally or alternatively, the federation management service 410 may initialize the client host based on receiving a set of federation metadata when executing the query of the federated API using the first set of scripts and the second set of scripts.

At 430, the federation management service 410 may receive, via the user interface of the federation management service 410, a second user input indicating a selection of a standalone development environment for developing one or more APIs.

At 435, the federation management service 410 may switch to the standalone development environment from the testing environment based on receiving the second user input.

Figure 5:
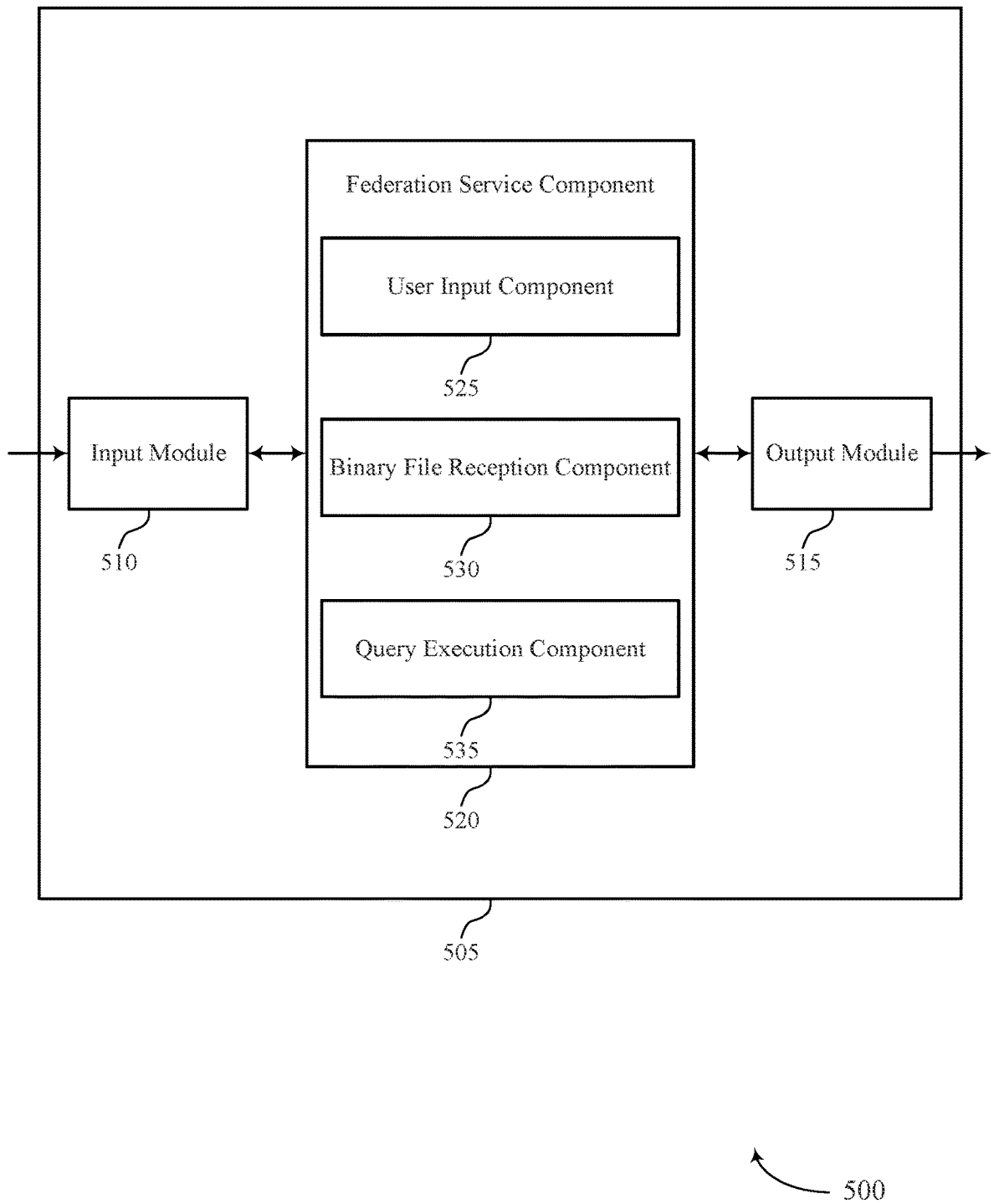
FIG. 5 shows a block diagram of an apparatus that supports portable binary files for client side execution of federated application programming interfaces in accordance with aspects of the present disclosure.

FIG. 5 shows a block diagram 500 of a device 505 that supports portable binary files for client side execution of federated application programming interfaces in accordance with aspects of the present disclosure. The device 505 may include an input module 510, an output module 515, and a federation service component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the federation service component 520 to support portable binary files for client side execution of federated application programming interfaces. In some cases, the input module 510 may be a component of an I/O controller 710 as described with reference to FIG. 7.

The output module 515 may manage output signals for the device 505. For example, the output module 515 may receive signals from other components of the device 505, such as the federation service component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the federation service component 520 may include a user input component 525, a binary file reception component 530, a query execution component 535, or any combination thereof. In some examples, the federation service component 520, or various components thereof, may be configured to perform various operations (e.g., receiving, monitoring, transmitting) using or otherwise in cooperation with the input module 510, the output module 515, or both. For example, the federation service component 520 may receive information from the input module 510, send information to the output module 515, or be integrated in combination with the input module 510, the output module 515, or both to receive information, transmit information, or perform various other operations as described herein.

The federation service component 520 may support data processing in accordance with examples as disclosed herein. The user input component 525 may be configured as or otherwise support a means for receiving, via a user interface of a federation management service, a first user input indicating a selection of a testing environment for testing a federated API. The binary file reception component 530 may be configured as or otherwise support a means for receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The query execution component 535 may be configured as or otherwise support a means for executing, within the web browser of the client host, a query of the federated API using the first set of scripts and the second set of scripts.

Figure 6:
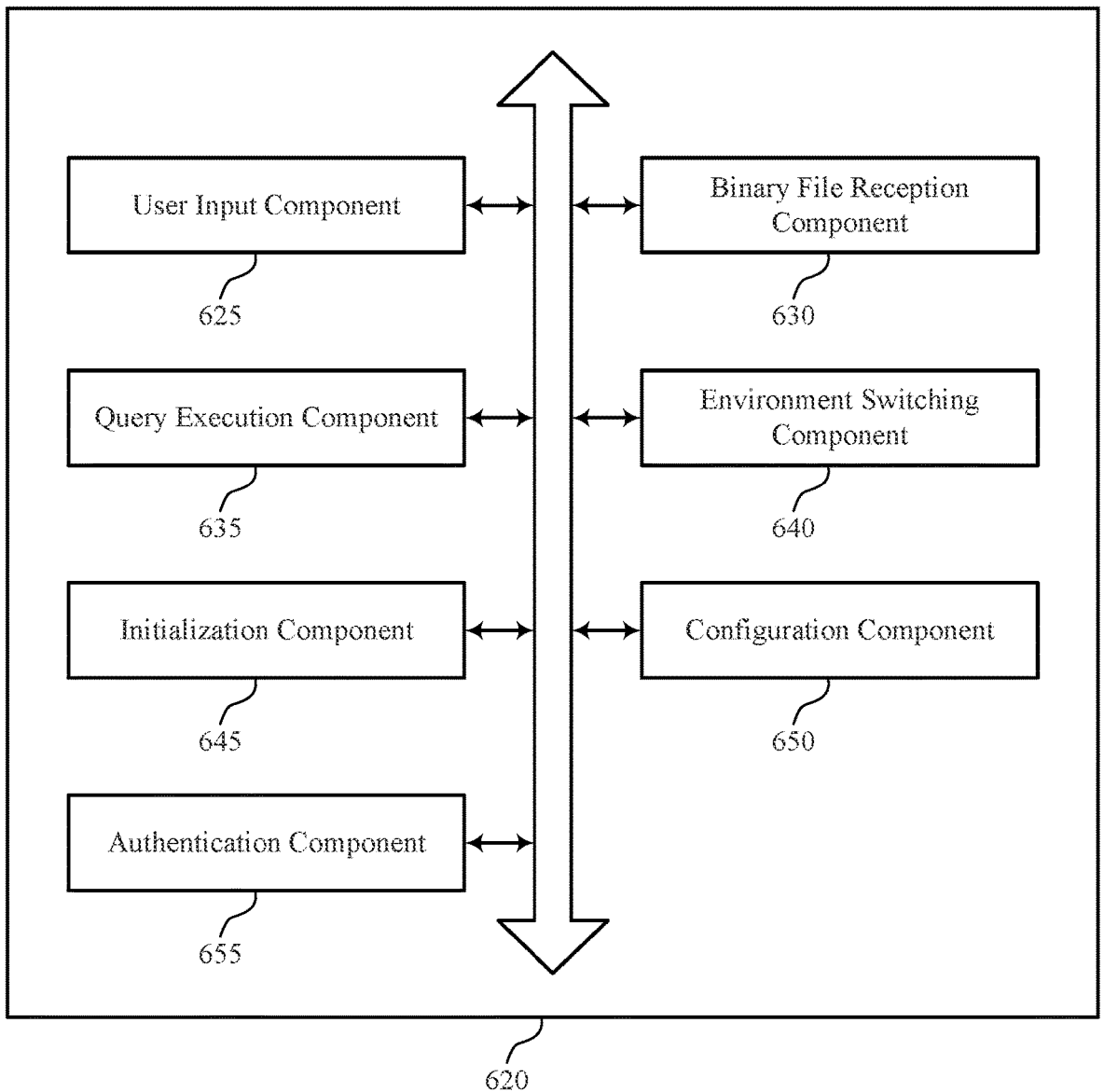
FIG. 6 shows a block diagram of a federation service component that supports portable binary files for client side execution of federated application programming interfaces in accordance with aspects of the present disclosure.

FIG. 6 shows a block diagram 600 of a federation service component 620 that supports portable binary files for client side execution of federated application programming interfaces in accordance with aspects of the present disclosure. The federation service component 620 may be an example of aspects of a federation service component or a federation service component 520, or both, as described herein. The federation service component 620, or various components thereof, may be an example of means for performing various aspects of portable binary files for client side execution of federated application programming interfaces as described herein. For example, the federation service component 620 may include a user input component 625, a binary file reception component 630, a query execution component 635, an environment switching component 640, an initialization component 645, a configuration component 650, an authentication component 655, or any combination thereof. Each of these components may communicate, directly or indirectly, with one another (e.g., via one or more buses).

The federation service component 620 may support data processing in accordance with examples as disclosed herein. The user input component 625 may be configured as or otherwise support a means for receiving, via a user interface of a federation management service, a first user input indicating a selection of a testing environment for testing a federated API. The binary file reception component 630 may be configured as or otherwise support a means for receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The query execution component 635 may be configured as or otherwise support a means for executing, within the web browser of the client host, a query of the federated API using the first set of scripts and the second set of scripts.

In some examples, the user input component 625 may be configured as or otherwise support a means for receiving, via the user interface of the federation management service, a second user input indicating a selection of a standalone development environment for developing one or more APIs. In some examples, the environment switching component 640 may be configured as or otherwise support a means for switching to the standalone development environment from the testing environment based on receiving the second user input.

In some examples, the initialization component 645 may be configured as or otherwise support a means for initializing the client host based on receiving a set of federation metadata when executing the query of the federated API using the first set of scripts and the second set of scripts.

In some examples, the configuration component 650 may be configured as or otherwise support a means for retrieving, from the client host, a configuration for network connectivity capabilities, where the second set of scripts for orchestrating communications between the web browser of the client host and the first set of scripts is based on the configuration.

In some examples, the authentication component 655 may be configured as or otherwise support a means for receiving authentication information associated with testing environment for testing the federated API.

In some examples, the authentication information associated with the testing environment and an authentication information associated with a standalone development environment are retrieved from a common source. In some examples, testing the federated API includes executing the query of the federated API at a set of multiple data sources.

In some examples, the first set of scripts for orchestrating query requests for the federated API includes a service deployed at runtime. In some examples, the portable binary format includes a web assembly format.

Figure 7:
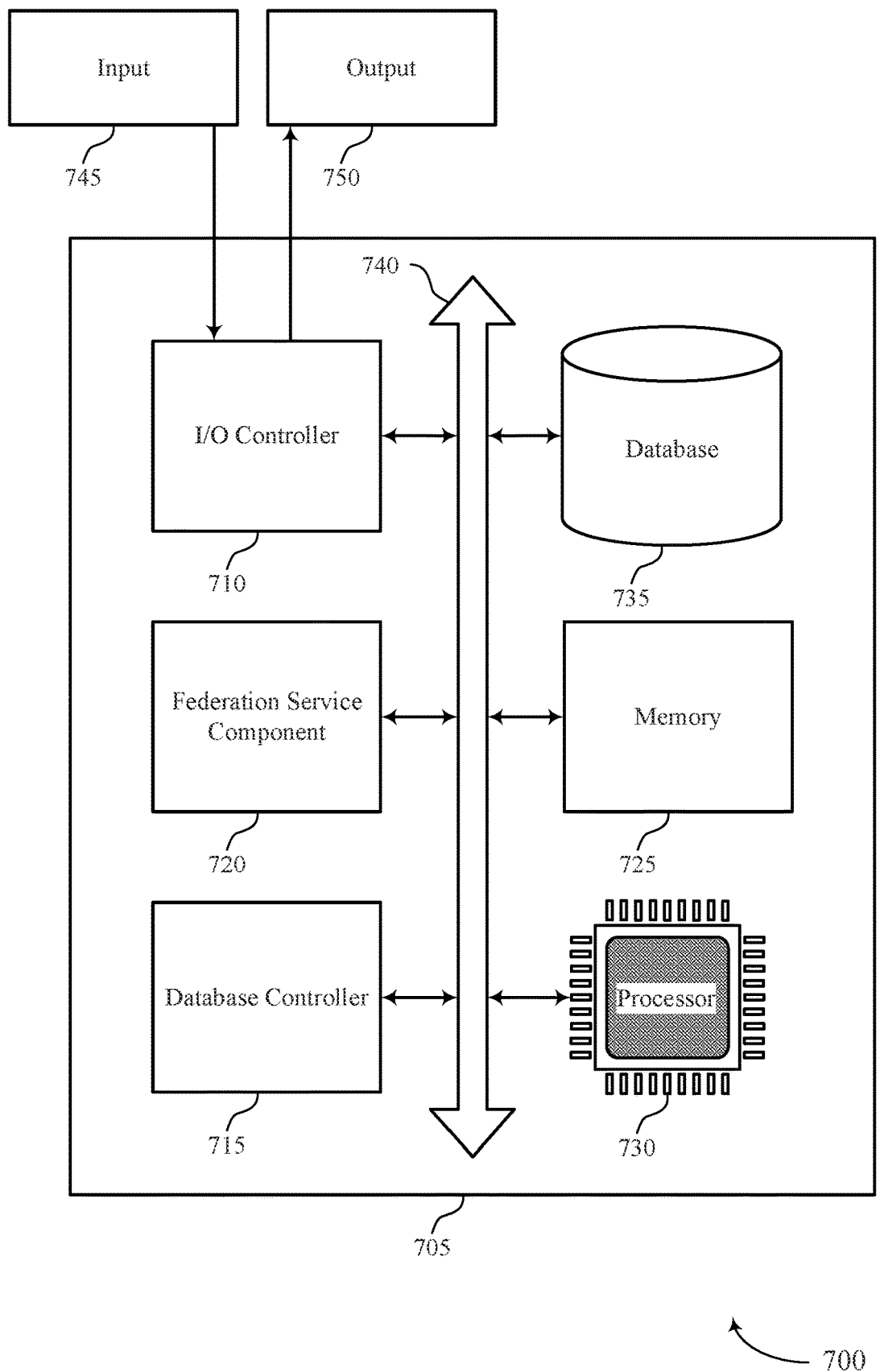
FIG. 7 shows a diagram of a system including a device that supports portable binary files for client side execution of federated application programming interfaces in accordance with aspects of the present disclosure.

FIG. 7 shows a diagram of a system 700 including a device 705 that supports portable binary files for client side execution of federated application programming interfaces in accordance with aspects of the present disclosure. The device 705 may be an example of or include the components of a device 505 as described herein. The device 705 may include components for bi-directional data communications including components for transmitting and receiving communications, such as a federation service component 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting portable binary files for client side execution of federated application programming interfaces).

The federation service component 720 may support data processing in accordance with examples as disclosed herein. For example, the federation service component 720 may be configured as or otherwise support a means for receiving, via a user interface of a federation management service, a first user input indicating a selection of a testing environment for testing a federated API. The federation service component 720 may be configured as or otherwise support a means for receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The federation service component 720 may be configured as or otherwise support a means for executing, within the web browser of the client host, a query of the federated API using the first set of scripts and the second set of scripts.

Figure 8:
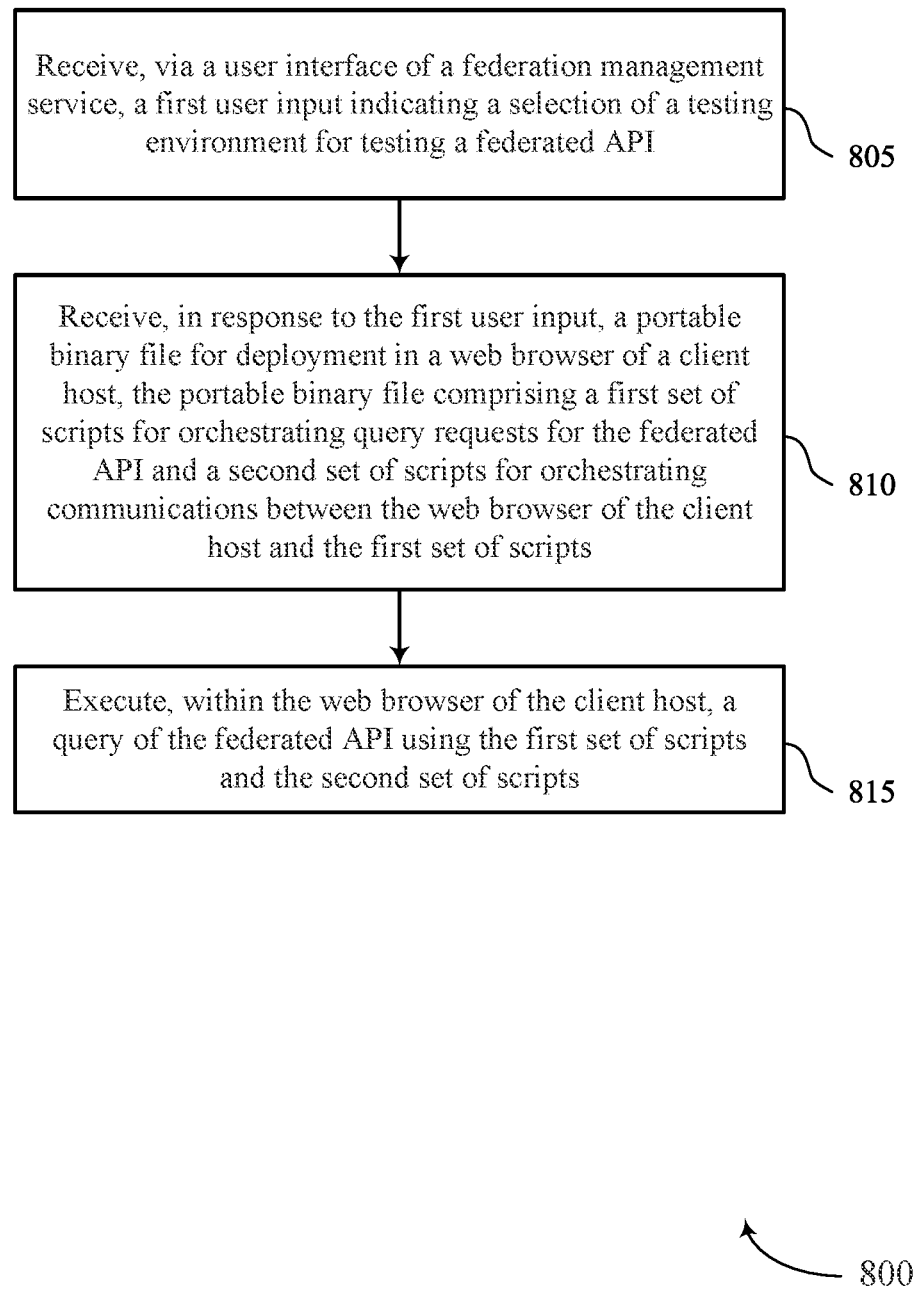
FIGS. 8 through 11 show flowcharts illustrating methods that support portable binary files for client side execution of federated application programming interfaces in accordance with aspects of the present disclosure.

By including or configuring the federation service component 720 in accordance with examples as described herein, the device 705 may support techniques for compiling the engine logic of the federation gateway service into a portable binary format with greater efficiency and reduced manual interaction. For example, the device 905 may use metadata annotations and schema information to generate a portable binary format that can be executed on a client host. As such, a client device (e.g., a client device 250 described with reference to FIG. 2) may execute the portable binary format to save computing resources and reduce manual interaction FIG. 8 shows a flowchart illustrating a method 800 that supports portable binary files for client side execution of federated application programming interfaces in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 805, the method may include receiving, via a user interface of a federation management service, a first user input indicating a selection of a testing environment for testing a federated API. The operations of 805 may be performed in accordance with examples as disclosed herein. In some examples, aspects of the operations of 805 may be performed by a user input component 625 as described with reference to FIG. 6.

At 810, the method may include receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The operations of 810 may be performed in accordance with examples as disclosed herein. In some examples, aspects of the operations of 810 may be performed by a binary file reception component 630 as described with reference to FIG. 6.

At 815, the method may include executing, within the web browser of the client host, a query of the federated API using the first set of scripts and the second set of scripts. The operations of 815 may be performed in accordance with examples as disclosed herein. In some examples, aspects of the operations of 815 may be performed by a query execution component 635 as described with reference to FIG. 6.

Figure 9:
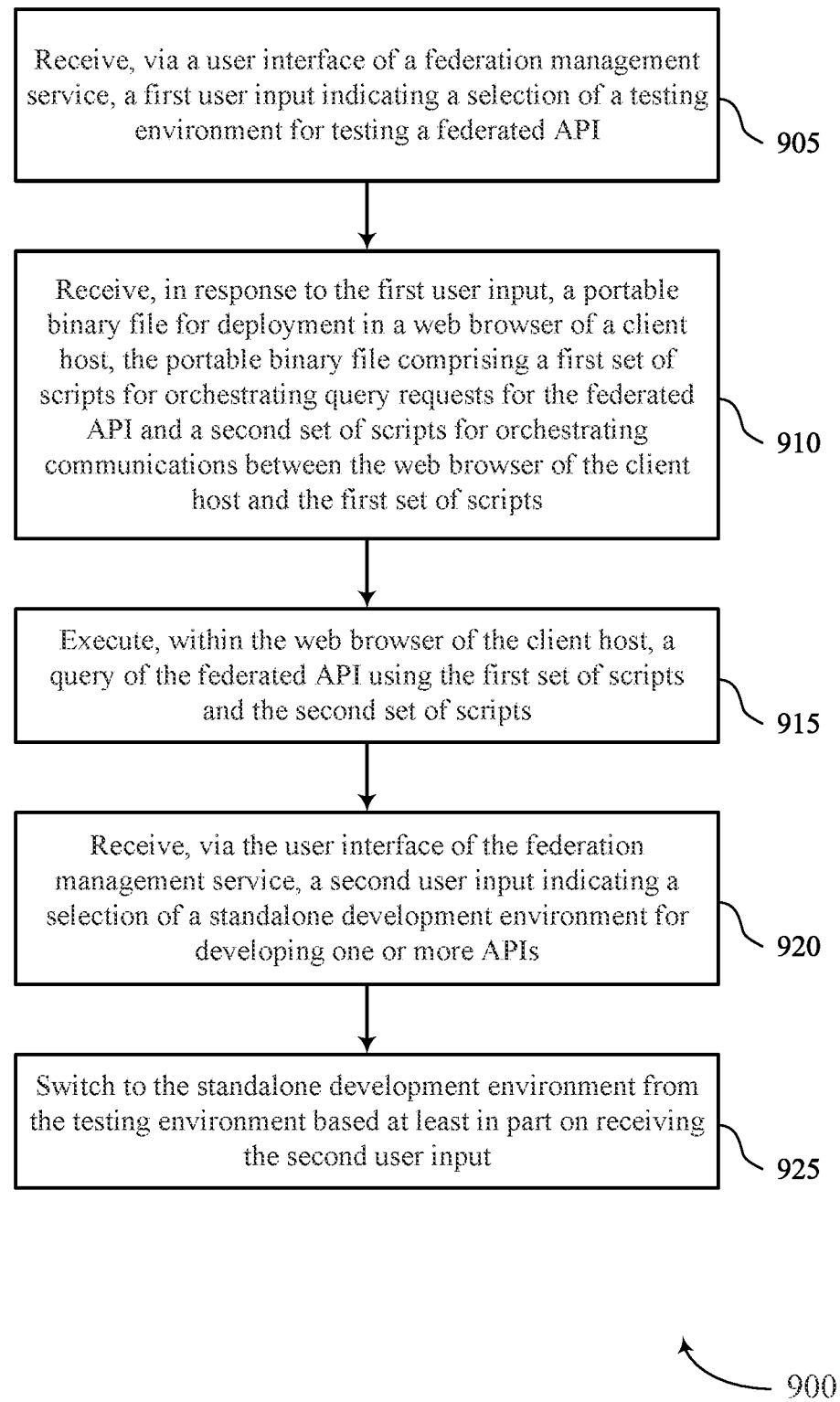

FIG. 9 shows a flowchart illustrating a method 900 that supports portable binary files for client side execution of federated application programming interfaces in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 905, the method may include receiving, via a user interface of a federation management service, a first user input indicating a selection of a testing environment for testing a federated API. The operations of 905 may be performed in accordance with examples as disclosed herein. In some examples, aspects of the operations of 905 may be performed by a user input component 625 as described with reference to FIG. 6.

At 910, the method may include receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The operations of 910 may be performed in accordance with examples as disclosed herein. In some examples, aspects of the operations of 910 may be performed by a binary file reception component 630 as described with reference to FIG. 6.

At 915, the method may include executing, within the web browser of the client host, a query of the federated API using the first set of scripts and the second set of scripts. The operations of 915 may be performed in accordance with examples as disclosed herein. In some examples, aspects of the operations of 915 may be performed by a query execution component 635 as described with reference to FIG. 6.

At 920, the method may include receiving, via the user interface of the federation management service, a second user input indicating a selection of a standalone development environment for developing one or more APIs. The operations of 920 may be performed in accordance with examples as disclosed herein. In some examples, aspects of the operations of 920 may be performed by a user input component 625 as described with reference to FIG. 6.

At 925, the method may include switching to the standalone development environment from the testing environment based on receiving the second user input. The operations of 925 may be performed in accordance with examples as disclosed herein. In some examples, aspects of the operations of 925 may be performed by an environment switching component 640 as described with reference to FIG. 6.

Figure 10:
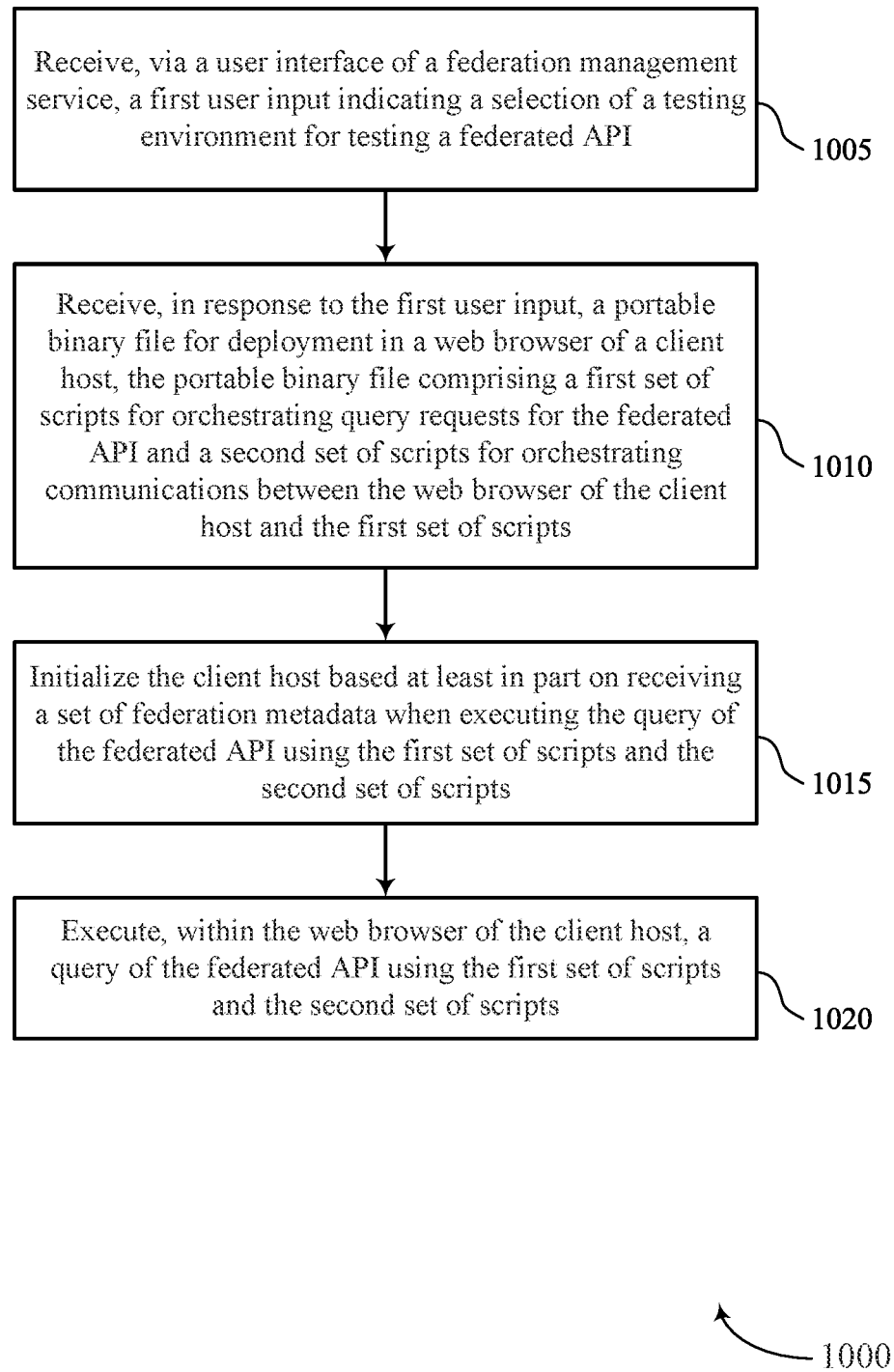

FIG. 10 shows a flowchart illustrating a method 1000 that supports portable binary files for client side execution of federated application programming interfaces in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 1005, the method may include receiving, via a user interface of a federation management service, a first user input indicating a selection of a testing environment for testing a federated API. The operations of 1005 may be performed in accordance with examples as disclosed herein. In some examples, aspects of the operations of 1005 may be performed by a user input component 625 as described with reference to FIG. 6.

At 1010, the method may include receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The operations of 1010 may be performed in accordance with examples as disclosed herein. In some examples, aspects of the operations of 1010 may be performed by a binary file reception component 630 as described with reference to FIG. 6.

At 1015, the method may include initializing the client host based on receiving a set of federation metadata when executing the query of the federated API using the first set of scripts and the second set of scripts. The operations of 1015 may be performed in accordance with examples as disclosed herein. In some examples, aspects of the operations of 1015 may be performed by an initialization component 645 as described with reference to FIG. 6.

At 1020, the method may include executing, within the web browser of the client host, a query of the federated API using the first set of scripts and the second set of scripts. The operations of 1020 may be performed in accordance with examples as disclosed herein. In some examples, aspects of the operations of 1020 may be performed by a query execution component 635 as described with reference to FIG. 6.

Figure 11:
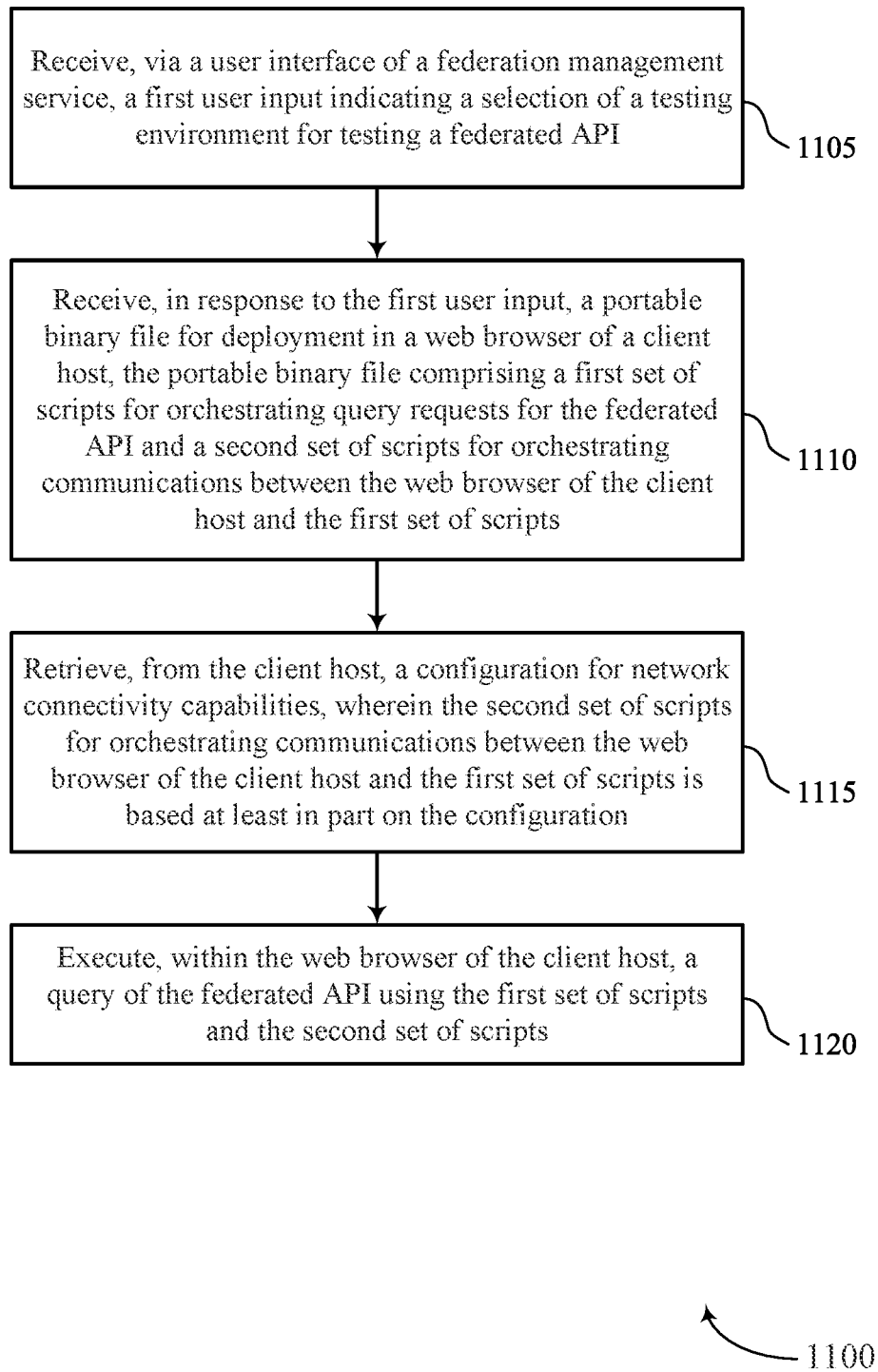

FIG. 11 shows a flowchart illustrating a method 1100 that supports portable binary files for client side execution of federated application programming interfaces in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally, or alternatively, the server may perform aspects of the described functions using special-purpose hardware.

At 1105, the method may include receiving, via a user interface of a federation management service, a first user input indicating a selection of a testing environment for testing a federated API. The operations of 1105 may be performed in accordance with examples as disclosed herein. In some examples, aspects of the operations of 1105 may be performed by a user input component 625 as described with reference to FIG. 6.

At 1110, the method may include receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts. The operations of 1110 may be performed in accordance with examples as disclosed herein. In some examples, aspects of the operations of 1110 may be performed by a binary file reception component 630 as described with reference to FIG. 6.

At 1115, the method may include retrieving, from the client host, a configuration for network connectivity capabilities, where the second set of scripts for orchestrating communications between the web browser of the client host and the first set of scripts is based on the configuration. The operations of 1115 may be performed in accordance with examples as disclosed herein. In some examples, aspects of the operations of 1115 may be performed by a configuration component 650 as described with reference to FIG. 6.

At 1120, the method may include executing, within the web browser of the client host, a query of the federated API using the first set of scripts and the second set of scripts. The operations of 1120 may be performed in accordance with examples as disclosed herein. In some examples, aspects of the operations of 1120 may be performed by a query execution component 635 as described with reference to FIG. 6.

A method for data processing is described. The method may include receiving, via a user interface of a federation management service, a first user input indicating a selection of a testing environment for testing a federated API, receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts, and executing, within the web browser of the client host, a query of the federated API using the first set of scripts and the second set of scripts.

An apparatus for data processing is described. The apparatus may include a processor, memory coupled with the processor, and instructions stored in the memory. The instructions may be executable by the processor to cause the apparatus to receive, via a user interface of a federation management service, a first user input indicating a selection of a testing environment for testing a federated API, receive, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts, and execute, within the web browser of the client host, a query of the federated API using the first set of scripts and the second set of scripts.

Another apparatus for data processing is described. The apparatus may include means for receiving, via a user interface of a federation management service, a first user input indicating a selection of a testing environment for testing a federated API, means for receiving, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts, and means for executing, within the web browser of the client host, a query of the federated API using the first set of scripts and the second set of scripts.

A non-transitory computer-readable medium storing code for data processing is described. The code may include instructions executable by a processor to receive, via a user interface of a federation management service, a first user input indicating a selection of a testing environment for testing a federated API, receive, in response to the first user input, a portable binary file for deployment in a web browser of a client host, the portable binary file including a first set of scripts for orchestrating query requests for the federated API and a second set of scripts for orchestrating communications between the web browser of the client host and the first set of scripts, and execute, within the web browser of the client host, a query of the federated API using the first set of scripts and the second set of scripts.

Some examples of the method, apparatuses, and non-transitory computer-readable medium described herein may further include operations, features, means, or instructions for receiving, via the user interface of the federation management service, a second user input indicating a selection of a standalone development environment for developing one or more APIs and switching to the standalone development environment from the testing environment based on receiving the second user input.

Some examples of the method, apparatuses, and non-transitory computer-readable medium described herein may further include operations, features, means, or instructions for initializing the client host based on receiving a set of federation metadata when executing the query of the federated API using the first set of scripts and the second set of scripts.

Some examples of the method, apparatuses, and non-transitory computer-readable medium described herein may further include operations, features, means, or instructions for retrieving, from the client host, a configuration for network connectivity capabilities, where the second set of scripts for orchestrating communications between the web browser of the client host and the first set of scripts may be based on the configuration.

Some examples of the method, apparatuses, and non-transitory computer-readable medium described herein may further include operations, features, means, or instructions for receiving authentication information associated with testing environment for testing the federated API.

In some examples of the method, apparatuses, and non-transitory computer-readable medium described herein, the authentication information associated with the testing environment and an authentication information associated with a standalone development environment may be retrieved from a common source.

Some examples of the method, apparatuses, and non-transitory computer-readable medium described herein may further include operations, features, means, or instructions for testing the federated API includes executing the query of the federated API at a set of multiple data sources.

In some examples of the method, apparatuses, and non-transitory computer-readable medium described herein, the first set of scripts for orchestrating query requests for the federated API includes a service deployed at runtime.

In some examples of the method, apparatuses, and non-transitory computer-readable medium described herein, the portable binary format includes a web assembly format.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving, via a user interface of a federation management service, a first user input indicating a selection of a testing environment for testing a federated application programming interface (API);
   receiving, in response to the first user input, a portable binary file for deployment in a web browser of a client host, the portable binary file comprising a first set of scripts for orchestrating query requests for the federated API and a second set of scripts for orchestrating communications between the web browser of the client host and the first set of scripts; and
   executing, within the web browser of the client host, a query of the federated API using the first set of scripts and the second set of scripts.

2. The method of claim 1, further comprising:
   receiving, via the user interface of the federation management service, a second user input indicating a selection of a standalone development environment for developing one or more APIs; and
   switching to the standalone development environment from the testing environment based at least in part on receiving the second user input.

3. The method of claim 1, further comprising:
   initializing the client host based at least in part on receiving a set of federation metadata when executing the query of the federated API using the first set of scripts and the second set of scripts.

4. The method of claim 1, further comprising:
   retrieving, from the client host, a configuration for network connectivity capabilities, wherein the second set of scripts for orchestrating the communications between the web browser of the client host and the first set of scripts is based at least in part on the configuration.

5. The method of claim 1, further comprising:
   receiving authentication information associated with the testing environment for testing the federated API.

6. The method of claim 5, wherein the authentication information associated with the testing environment and an authentication information associated with a standalone development environment are retrieved from a common source.

7. The method of claim 1, wherein testing the federated API comprises executing the query of the federated API at a plurality of data sources.

8. The method of claim 1, wherein the first set of scripts for orchestrating query requests for the federated API comprises a service deployed at runtime.

9. The method of claim 1, wherein a portable binary format associated with the portable binary file comprises a web assembly format.

10. An apparatus for data processing, comprising:
    a processor,
    memory coupled with the processor; and
    instructions stored in the memory and executable by the processor to cause the apparatus to:
    receive, via a user interface of a federation management service, a first user input indicating a selection of a testing environment for testing a federated application programming interface (API);
    receive, in response to the first user input, a portable binary file for deployment in a web browser of a client host, the portable binary file comprising a first set of scripts for orchestrating query requests for the federated API and a second set of scripts for orchestrating communications between the web browser of the client host and the first set of scripts; and
    execute, within the web browser of the client host, a query of the federated API using the first set of scripts and the second set of scripts.

11. The apparatus of claim 10, wherein the instructions are further executable by the processor to cause the apparatus to:
    receive, via the user interface of the federation management service, a second user input indicating a selection of a standalone development environment for developing one or more APIs; and
    switch to the standalone development environment from the testing environment based at least in part on receiving the second user input.

12. The apparatus of claim 10, wherein the instructions are further executable by the processor to cause the apparatus to:
    initialize the client host based at least in part on receiving a set of federation metadata when executing the query of the federated API using the first set of scripts and the second set of scripts.

13. The apparatus of claim 10, wherein the instructions are further executable by the processor to cause the apparatus to:
    retrieve, from the client host, a configuration for network connectivity capabilities, wherein the second set of scripts for orchestrating the communications between the web browser of the client host and the first set of scripts is based at least in part on the configuration.

14. The apparatus of claim 10, wherein the instructions are further executable by the processor to cause the apparatus to:
    receive authentication information associated with the testing environment for testing the federated API.

15. The apparatus of claim 14, wherein the authentication information associated with the testing environment and an authentication information associated with a standalone development environment are retrieved from a common source.

16. The apparatus of claim 10, wherein testing the federated API comprises executing the query of the federated API at a plurality of data sources.

17. The apparatus of claim 10, wherein the first set of scripts for orchestrating query requests for the federated API comprises a service deployed at runtime.

18. The apparatus of claim 10, wherein a portable binary format associated with the portable binary file comprises a web assembly format.

19. A non-transitory computer-readable medium storing code for data processing, the code comprising instructions executable by a processor to:
   receive, via a user interface of a federation management service, a first user input indicating a selection of a testing environment for testing a federated application programming interface (API);
   receive, in response to the first user input, a portable binary file for deployment in a web browser of a client host, the portable binary file comprising a first set of scripts for orchestrating query requests for the federated API and a second set of scripts for orchestrating communications between the web browser of the client host and the first set of scripts; and
   execute, within the web browser of the client host, a query of the federated API using the first set of scripts and the second set of scripts.

20. The non-transitory computer-readable medium of claim 19, wherein the instructions are further executable by the processor to:
   receive, via the user interface of the federation management service, a second user input indicating a selection of a standalone development environment for developing one or more APIs; and
   switch to the standalone development environment from the testing environment based at least in part on receiving the second user input.

\* \* \* \* \*